(12) United States Patent
Martin et al.

(10) Patent No.: US 10,273,891 B2
(45) Date of Patent: Apr. 30, 2019

(54) GASEOUS FUEL INTERNAL COMBUSTION ENGINE AND OPERATING METHOD THEREFOR

(71) Applicant: Caterpillar Inc., Peoria, IL (US)

(72) Inventors: Glen Martin, Peoria, IL (US); David Ginter, Commerce Township, MI (US); Jaswinder Singh, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 135 days.

(21) Appl. No.: 15/356,116

(22) Filed: Nov. 18, 2016

(65) Prior Publication Data

US 2018/0142632 A1  May 24, 2018

(51) Int. Cl.

| | |
|---|---|
| *F02D 41/00* | (2006.01) |
| *F02D 41/40* | (2006.01) |
| *F02P 5/04* | (2006.01) |
| *F02P 15/00* | (2006.01) |
| *F02M 21/02* | (2006.01) |
| *F02D 41/38* | (2006.01) |
| *F02P 3/00* | (2006.01) |
| *F02P 23/04* | (2006.01) |

(52) U.S. Cl.
CPC ....... *F02D 41/0027* (2013.01); *F02D 41/403* (2013.01); *F02M 21/0245* (2013.01); *F02M 21/0263* (2013.01); *F02M 21/0275* (2013.01); *F02P 5/04* (2013.01); *F02P 15/00* (2013.01); *F02D 2041/389* (2013.01); *F02P 3/00* (2013.01); *F02P 5/045* (2013.01); *F02P 23/04* (2013.01); *Y02T 10/32* (2013.01); *Y02T 10/44* (2013.01)

(58) Field of Classification Search
CPC ............... F02D 41/0027; F02D 41/403; F02D 2041/389; F02P 15/00; F02P 5/04; F02M 61/1813; F02M 61/04
See application file for complete search history.

(56) References Cited

U.S. PATENT DOCUMENTS

| | | | | |
|---|---|---|---|---|
| 4,029,072 A | * | 6/1977 | Goto | F02B 19/12 123/143 B |
| 5,423,178 A | | 6/1995 | Mains | |
| 6,382,179 B1 | * | 5/2002 | Hansson | F02B 23/0669 123/305 |
| 7,162,994 B2 | | 1/2007 | Li et al. | |
| 8,322,325 B2 | | 12/2012 | Rogak et al. | |
| 8,869,770 B2 | * | 10/2014 | Bazyn | F02B 23/0651 123/275 |
| 2005/0257769 A1 | * | 11/2005 | Li | F02B 7/06 123/299 |
| 2014/0331961 A1 | * | 11/2014 | Ness | F02F 3/28 123/294 |

(Continued)

FOREIGN PATENT DOCUMENTS

EP    3061951    8/2016

*Primary Examiner* — Joseph J Dallo
*Assistant Examiner* — Kurt Philip Liethen
(74) *Attorney, Agent, or Firm* — Jonathan F. Yates

(57) ABSTRACT

Operating a gaseous fuel engine includes injecting a pilot charge directly into a combustion chamber in an engine, and igniting one spray plume of the pilot charge. A flame front is propagated to other pilot spray plumes to produce an ignition flame for igniting later injected main charge spray plumes. Injection of the pilot and main charges is by way of the same fuel injection orifices.

16 Claims, 3 Drawing Sheets

(56) References Cited

U.S. PATENT DOCUMENTS

| | | | | |
|---|---|---|---|---|
| 2014/0345565 A1* | 11/2014 | Mori | ...................... | F02P 17/12 |
| | | | | 123/406.12 |
| 2016/0069320 A1* | 3/2016 | Idicheria | ............ | F02D 13/0261 |
| | | | | 123/298 |
| 2016/0186673 A9 | 6/2016 | Huang et al. | | |
| 2016/0290273 A1* | 10/2016 | Ochi | ..................... | F02D 41/403 |
| 2017/0284329 A1* | 10/2017 | Ashizawa | ........... | F02D 41/3047 |

\* cited by examiner

GASEOUS FUEL INTERNAL COMBUSTION ENGINE AND OPERATING METHOD THEREFOR

TECHNICAL FIELD

The present disclosure relates generally to operating strategies for gaseous fuel engines, and more particularly to combustion of gaseous fuel initiated by way of injection of both pilot and main gaseous fuel charges through the same set of injection orifices.

BACKGROUND

Internal combustion engines are well known and widely used for all manner of applications where production of rotational power is desired. The general principals relating to delivery of a combustible fuel into a cylinder will be familiar to many, with ignition and combustion of the fuel producing a rapid pressure and temperature rise to drive a piston coupled with a rotatable crankshaft. Virtually innumerable variations on the basic strategy of fuel delivery and combustion to drive a piston have been proposed over the years. Engineers have experimented for well over a century with different ways to open and close engine valves, directly or indirectly inject or otherwise deliver fuel, handle exhaust gases, compress intake gases, and a host of other variables. The types of fuel used to power internal combustion engines are diverse as well.

Traditional gasoline engines utilize petroleum distillates that are injected either directly into an engine cylinder, or into an intake conduit feeding air and the fuel to an engine cylinder. Such engines typically employ a spark to ignite a mixture of fuel and air within the cylinder. Diesel engines operate somewhat differently, with fuel injection almost universally occurring directly into the cylinder, and reliance upon high pressure within the cylinder to induce autoignition of fuel and air therein. Traditional gasoline engines and traditional diesel engines offer various advantages in certain applications, and of course certain disadvantages unique to the respective technologies. In recent years, considerations as to exhaust emissions, cost, and resource availability have driven increased interest in so-called gaseous fuel engines.

Gaseous fuel engines typically employ a fuel in gaseous form, such as methane, ethane, propane, and mixtures of these and other hydrocarbon and non-hydrocarbon fuels. Gaseous fuels can be burned in at least certain applications to produce reduced particulate matter and nitrogen oxides, collectively "NOx", and with better balance between and among certain emissions, as well as potentially greater efficiency in at least certain applications. A challenge in many gaseous fuel engines relates to a relatively greater difficulty in achieving ignition, either because such engines are operated at relatively lean conditions or because constituents of the gaseous fuel are inherently more difficult to ignite.

Engineers have experimented with gaseous fuel ignition in a variety of ways, and in certain engines employ a so-called pre-chamber ignition device. A pre-chamber ignition device can produce a local combustion of a relatively rich mixture of a fuel and air, to produce jets of flame that are directed into a combustion chamber in the engine to ignite a main charge of gaseous fuel therein. The relatively small fuel charge ignited in the pre-chamber may be a liquid fuel, with such engines sometimes being referred to as dual-fuel engines. Other dual-fuel engine strategies rely upon injection of a pilot charge of liquid fuel directly into an engine to ignite a main charge of gaseous fuel. European Patent Application EP3061951A1 is entitled Fuel Injection Unit, and proposes an apparatus for injecting a liquid pilot fuel into a combustion chamber, and also injecting a gaseous medium. Still other strategies have proposed the use of the same fuel for both pilot and main charge functions, utilizing relatively complex and expensive apparatus. No single gaseous fuel ignition technology has yet emerged that shows sufficient promise for widespread commercial adoption, thus there is ample room for improvement in the gaseous fuel engine art.

SUMMARY OF THE INVENTION

In one aspect, a method of operating a gaseous fuel internal combustion engine includes injecting a pilot charge of gaseous fuel from a plurality of fuel injection orifices of a fuel injector into a combustion chamber in the internal combustion engine to form a plurality of pilot spray plumes. The method further includes igniting one of the plurality of pilot spray plumes at a fixed ignition point within the combustion chamber, and propagating a flame front of the ignited pilot spray plume to the other pilot spray plumes. The method further includes injecting a main charge of gaseous fuel from the plurality of fuel injection orifices into the combustion chamber to form a plurality of main spray plumes, and igniting the plurality of main spray plumes within the combustion chamber by way of the propagated flame front.

In another aspect, a gaseous fuel internal combustion engine includes a gaseous fuel supply, and an engine housing including an engine block and an engine head assembly coupled with the engine block. The engine further includes a piston positioned to reciprocate within the engine block, and the piston, the engine block, and the engine head assembly defining a combustion chamber. The engine further includes an igniter supported within the engine head assembly and defining a fixed ignition point within the combustion chamber. The engine still further includes a fuel injector supported within the engine head assembly and coupled with the gaseous fuel supply, the fuel injector including an injector body having a nozzle, and an outlet check movable within the injector body to open and close the plurality of injection orifices formed in the nozzle. The plurality of injection orifices define a plurality of plume paths arranged for injection of both pilot and main charges of gaseous fuel. A first one of the plume paths intersects the fixed ignition point and the other plume paths are successively spaced from the fixed ignition point, such that a flame front formed by igniting a pilot spray plume injected along the first one of the plume paths is propagated to a plurality of other pilot spray plumes injected along the other plume paths to form an ignition flame positioned to ignite main spray plumes of a main charge of the gaseous fuel.

In still another aspect, a gaseous fuel delivery and ignition system for an internal combustion engine includes a gaseous fuel supply conduit, and an engine head assembly structured to couple with an engine block having a piston reciprocable within the engine block. The system further includes an igniter supported within the engine head assembly and defining a fixed ignition point. A gaseous fuel injector is supported within the engine head assembly and includes an injector body having a nozzle with a plurality of gaseous fuel injection orifices formed therein, a gaseous fuel inlet formed in the injector body and in fluid communication with the gaseous fuel supply conduit, and a gaseous fuel nozzle supply passage extending between the gaseous fuel inlet and the gaseous fuel injection orifices. The gaseous fuel injector further includes an outlet check movable within the injector body to open and close the plurality of gaseous fuel injection orifices, and the plurality of gaseous fuel injection orifices defining a plurality of plume paths arranged for injection of both pilot and main charges of gaseous fuel into a combustion chamber. A first one of the plume paths intersects the fixed ignition point and the other plume paths are successively spaced from the fixed ignition point, such that a flame front formed by igniting a pilot spray plume injected along the first one of the plume paths is propagated to a plurality of other pilot spray plumes injected along the other plume paths to form a main charge ignition flame.

DETAILED DESCRIPTION

Figure 1:
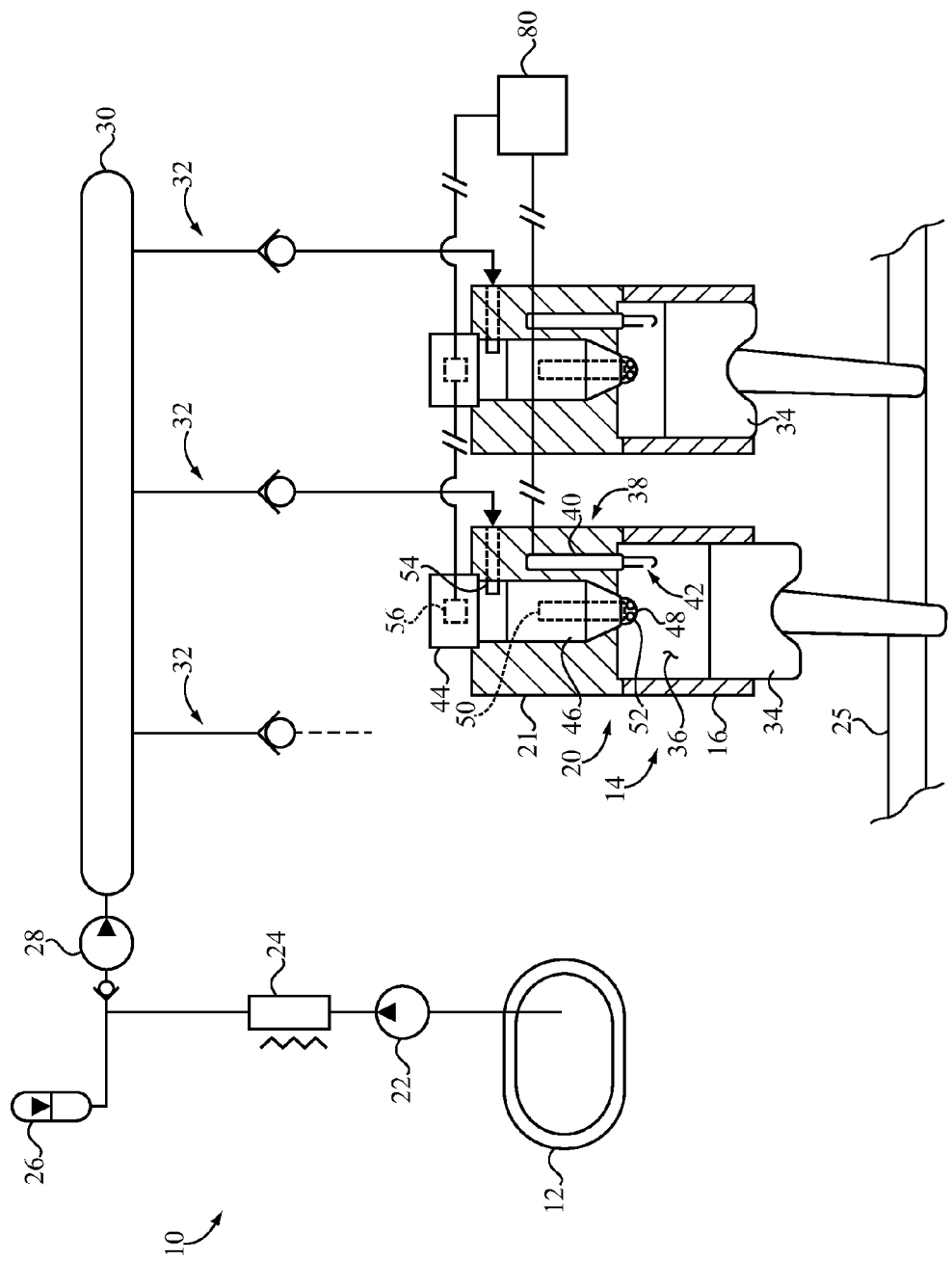
FIG. 1 is a partially sectioned diagrammatic view of a gaseous fuel engine system, according to one embodiment.

Referring to FIG. 1, there is shown a gaseous fuel internal combustion engine system 10 according to one embodiment. Gaseous fuel internal combustion engine system 10 (hereinafter "engine system 10") includes a gaseous fuel supply 12 structured to contain a gaseous fuel, commonly in a cryogenic liquid state. Suitable gaseous fuels include natural gas or "LNG", propane or "LP", various mixtures containing methane, ethane or other hydrocarbon fuels having a gaseous state at standard temperature and pressure, or still other gaseous fuels or mixtures such as landfill gas or biogas. Engine system 10 further includes an engine 14 having an engine housing 16 including an engine block 18 and engine head assembly 20 coupled with engine block 18. A piston 34, in the illustrated embodiment a plurality of pistons 34, is positioned to reciprocate within engine block 18, and piston 34, engine block 18 and engine head assembly 20 define one or more combustion chambers 36. It should be appreciated that engine 14 might include any number of pistons and combustion chambers, and descriptions herein of components such as piston 34 and combustion chamber 36 in the singular should be understood to analogously refer to whatever additional pistons, combustion chambers, and other plural elements that might be used.

A fuel transfer pump 22 may be coupled with or positioned within gaseous fuel supply 12, and structured to pump the gaseous fuel in a liquid form to a vaporizer 24 that enables transitioning the cold liquid fuel to a gaseous form, such as by way of exchanging heat in a heat exchanger or the like that may be supplied with heated fluid from engine 14. Engine system 10 may further include an accumulator 26 and a high-pressure fuel pump 28 that pressurizes the gaseous fuel now in a gaseous form and supplies the same to a pressurized storage volume in the nature of a common rail 30 or the like. A plurality of fuel delivery conduits 32 may extend between common rail 30 and engine 14 to supply gaseous fuel from common rail 30 to each of the cylinders or combustion chambers 36 formed in engine block 16. Engine system 10 may further include a gaseous fuel delivery and ignition system 38, which includes engine head assembly 20 and other components yet to be described. As will be further apparent from the following description, gaseous fuel delivery and injection system 38 is uniquely configured to ignite gaseous fuels within engine 14 and combust the gaseous fuels in a manner that provides various advantages over conventional gaseous fuel engine design and operating strategies.

Gaseous fuel delivery and ignition system 38 (hereinafter "ignition system 38") further includes an igniter 40 supported within engine head assembly 20 and defining a fixed ignition point 42 within combustion chamber 36. Igniter 40 may include an electromagnetic discharge igniter in the nature of a corona igniter, a laser or a spark plug. Fixed ignition point 42 may thus be a spark gap, a corona discharge path or paths, a laser target location or laser target propagation path(s) or some other electromagnetic discharge fixed ignition point. In the present description the term "spark plug" is used interchangeably with the term "igniter" and the term "ignition point" is used interchangeably with the term "spark gap." While spark-ignition technology provides a practical implementation strategy, it should be appreciated that no particular limitation to spark-ignition is intended within the context of the present disclosure. It should further be appreciated that a total number of igniter(s) 40 may be equal to a total number of combustion chambers in engine 14. In many embodiments a plurality of combustion chambers in the nature of a plurality of cylinders will be formed in engine block 16, however, a single cylinder engine design might nevertheless be employed. Still other optional or additional features such as a turbocharging system and air and exhaust handling components generally will typically be part of engine system 10 but are not shown in FIG. 1.

Ignition system 38 further includes a fuel injector 44 supported within engine head assembly 20 and coupled with gaseous fuel supply 12. Fuel injector 44 includes an injector body 46 having a nozzle 48 that is positioned at least partially within combustion chamber 36, and an outlet check 50 movable within injector body 46 to open and close a plurality of injection orifices 52 formed in nozzle 48. Engine system 10 and/or ignition system 38 may further be equipped with an electronic control unit 80 (hereinafter "ECU 80") that is in control communication with an electrically actuated mechanism 56 within each of the fuel injectors 44 of engine system 10. In a practical implementation strategy, electrically actuated mechanism 56 is structured to controllably lift outlet check 50 to fluidly connect injection orifices 52 with a gaseous fuel inlet 54 and gaseous fuel supply passage (not shown in FIG. 1) in injector body 46. Electrically actuated mechanism 56 could include a pilot valve assembly that controls hydraulic pressure acting upon a closing hydraulic surface of outlet check 50 to directly control opening and closing of outlet check 50, or in other instances mechanism 56 could be an electrical actuator directly coupled to outlet check 50. Those skilled in the art will appreciate a variety of direct or indirect hydraulic and non-hydraulic control strategies for varying a position of outlet check 50 to control injection of gaseous fuel.

Figure 2:
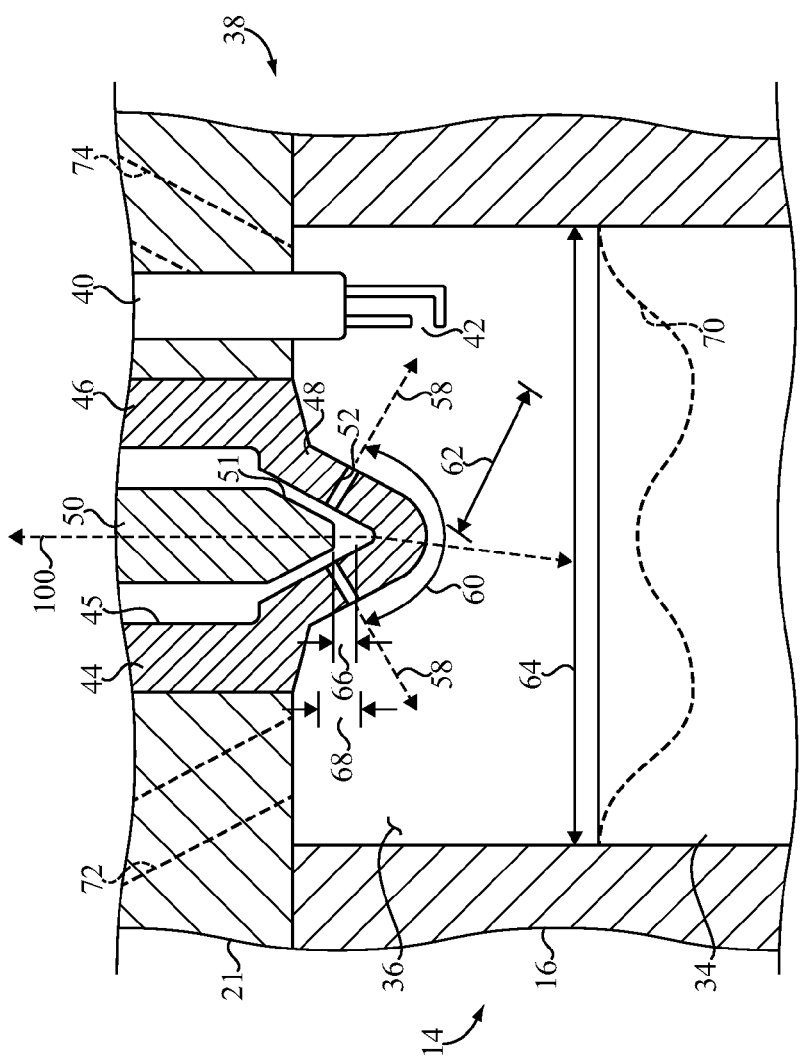
FIG. 2 is a partially sectioned side diagrammatic view through a portion of an engine of the gaseous fuel engine system of FIG. 1.

Referring now also to FIG. 2, there are shown certain additional features of engine system 10, and more particularly ignition system 38. In FIG. 2 outlet check 50 can be seen positioned within injector body 46 as it might appear having been lifted a first travel distance 66 from a closed or seated position in nozzle 48, such as might be observed when outlet check 50 is operated to produce pilot gaseous fuel injections. Where main fuel injections are desired outlet check 50 can be lifted a greater travel distance 68, with ECU 80 being appropriately configured to energize and deenergize electrical actuation mechanism 56 to produce injections of varying duration and potentially varying rate shape if desired. While it is contemplated that practical implementations will include pressurization of gaseous fuel to an injection pressure that is maintained within common rail 30, it is conceivable in other embodiments that a separate pressurization mechanism such as a gas pressurization plunger might be provided within fuel injector 44. A gas pressurization plunger might be hydraulically actuated or actuated by an engine cam.

Also shown in FIG. 2 are plume paths 58, more specifically the plume path center axes, that are associated with two injection orifices 52 that are in-plane in FIG. 1, and extend outwardly from nozzle 48. Fuel injection orifices 52 may number from about 5 to about 10 in many embodiments, although the present disclosure is not thereby limited. A center axis 100 is defined by injection orifices 52 and may be an axis common to reciprocation of outlet check 50 and for that matter piston 34 in the illustrated embodiment. It can also be seen that fuel injector 44 and more particularly nozzle 48 is generally centered in combustion chamber 36, although in other embodiments off center or diagonally oriented fuel injector configurations might be employed. Also shown is a gaseous fuel supply passage 45 formed in injector body 46, which provides a fluid connection between gaseous fuel inlet 54 and injection orifices 52. Injection orifices 52 may be laser drilled, drilled by wire EDM, or formed by any other suitable technique. Injection orifices 52 may also have a constant inner diameter between fuel passage 45 and combustion chamber 36, although trumpet shaped injection orifices or outwardly narrowing injection orifices are within the scope of the present disclosure.

Also shown in FIG. 2 is a spray angle 60 defined by injection orifices 52, and typically being from about 100 degrees to about 160 degrees. A combustion bowl 70 may be formed in piston 34, and those skilled in the art will appreciate certain relationships between desired spray angle and combustion bowl configuration generally consistent with analogous considerations in conventional diesel engines. No particular piston geometry or spray angle, orifice number, orifice shape or orientation is intended by way of the present disclosure, apart from certain capabilities of gaseous fuel ignition in a manner and for reasons that will be apparent from the following description.

Plume paths 58 may be arranged and oriented in three-dimensional space based upon configuration and arrangement of injection orifices 52, and such that both pilot and main charges of gaseous fuel may be injected from the same injection orifices 52. Those skilled in the art will appreciate the distinction of such a strategy over known systems where separate orifices or orifice sets are used for pilot charge injection versus main charge injection. A first one of plume paths 58 intersects fixed ignition point or spark gap 42 and the other plume paths 58 are successively spaced from fixed ignition point or spark gap 42, such that a flame front formed by igniting a pilot spray plume injected along the first one of plume paths 58 is propagated to a plurality of other pilot spray plumes injected along the other plume paths 58. The propagation of the flame front forms a composite ignition flame positioned to ignite main spray plumes of a main charge of a gaseous fuel.

Figure 3:
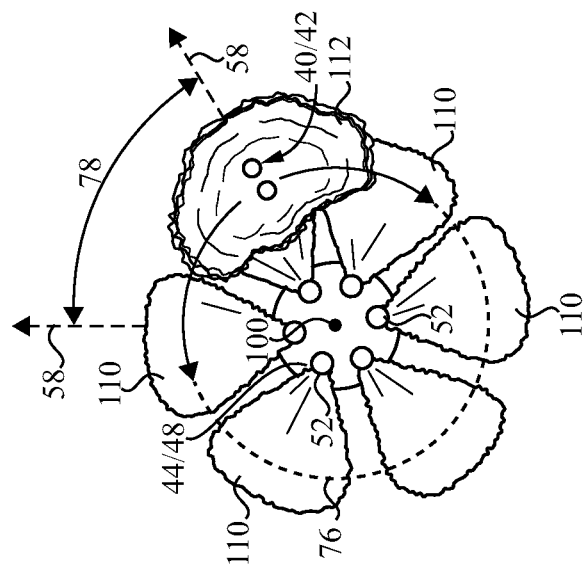
FIG. 3 is a diagrammatic end view of a portion of the engine at one combustion stage, according to one embodiment.

Referring also now to FIG. 3 there is shown additional details of gaseous fuel flow, ignition, and flame propagation that further illustrate principles of the present disclosure. FIG. 3 is an end view of fuel injector 44/nozzle 48 where it can be seen that injection orifices 52 are spaced more or less uniformly circumferentially about center axis 100, and are six in number. An inter-orifice angle 78 is also shown in FIG. 3, and might be about 60 degrees. It is contemplated that an inter-orifice angle according to the present disclosure between adjacent ones of injection orifices 52 may be from about 30 degrees to about 90 degrees. In other embodiments, alternative arrangements including non-uniform arrangement of injection orifices 52 might yield different plume path configurations and different inter-orifice spacing. It should also be appreciated that the description herein of one of plume paths 58 intersecting spark gap 42 is best understood as the entire plume produced by one of injection orifices 52 being oriented such that the injected fuel charge and entrained air flows about spark gap 42. Thus, while the illustration of FIG. 2 and the illustration of FIG. 3 might be taken to suggest that the plume path center axis is pointed directly at a middle of spark gap 42, in other embodiments the subject plume path 58 might be shifted vertically up or down or circumferentially one way or another about center axis 100, so long as a pilot spray plume can intersect spark gap 42 and enable ignition of the pilot charge of gaseous fuel.

Those skilled in the art will further appreciate that successful ignition of a pilot charge of gaseous fuel by way of a spark or other electromagnetic discharge can require the pilot spray plume having sufficient residence time and/or penetration depth into combustion chamber 36 so that some air can be entrained with the injected gaseous fuel. In other words, a spark, corona discharge, or laser pulse, will be unsuccessful in igniting pure gaseous fuel in the absence of oxidant, thus a spacing of the fixed ignition point or spark gap 42 from the one injection orifice 52 with which it is associated is such that an injected pilot spray plume is able to shear with air within combustion chamber 36 to provide a mixture of air and gaseous fuel at spark gap 42.

It can also be seen as illustrated in FIG. 2 that spark gap 42 is located at a spark gap distance 62 from the corresponding one of injection orifices 52. Distance 62 may be from about 15 mm to about 30 mm, more particularly from about 18 mm to about 27 mm. Fuel injection pressures in engine system 10 may be about twice the in-cylinder peak pressure, such that in certain instances the fuel injection pressure may be about 30 megapascals (MPa) to about 35 MPa. In the illustrated embodiment engine 14 may be structured such that a cylinder bore diameter 64 is from about 150 mm to about 200 mm, more particularly about 175 mm. An injection timing of pilot injections may be prior to the corresponding piston 34 reaching a top dead center position, and in a practical implementation might be about 20 degrees before top dead center to several degrees or as much as 10 degrees after top dead center. An injection amount of a pilot injection may be equal to about 10 percent of a main injection. In a practical implementation strategy at full load in a 175 mm bore engine the total pilot and main injection amounts together may be greater than 500 mg, for example about 600 mg.

Returning back to patterns of fuel injection and flame propagation, it can be seen from FIG. 2 that pilot spray plumes 110 may be oriented such that pilot spray plumes 110 do not begin to overlap until at or close to reaching a circle 76 intersected by each of the corresponding plume paths 58. With plume paths directed radially outward from center axis 100 and axially downward toward piston 34, it will be appreciated that spray plumes 110 could define a roughly conical shape. If injection orifices 52 are not arranged to form a conical pattern a different geometry of pilot spray plumes such as an undulating geometry circumferentially about center axis 100 might exist in three-dimensional space. In still other instances rather than a uniform spacing of injection orifices 52, injection orifices 52 could be staggered, or potentially increase in spacing or decrease in spacing in directions circumferentially away from spark gap 42. In FIG. 2 a flame front 112 is shown illustrating the bidirectional circumferential propagation of the spark-ignited combustion of the one of spray plumes 110 that intersect spark gap 42. Circle 76 may thus be understood to lie in a plane oriented normal to center axis 100, which is the plane of the page in FIG. 2.

Figure 4:
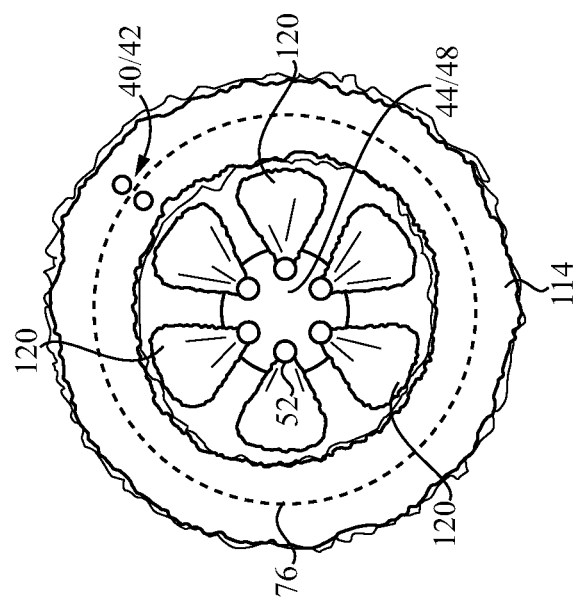
FIG. 4 is a view similar to FIG. 3 at another combustion stage.

Referring also now to FIG. 4, there is shown an end view of fuel injector 44 and nozzle 48 where flame propagation from the ignition of the one of pilot spray plumes 110 has propagated in an annular pattern generally about circle 76 to form a composite and generally toroidal ignition flame positioned in the path of a plurality of main spray plumes 120 traveling radially outward and axially downward from injection orifices 52. It will be appreciated that main spray plumes 120 are shown as they might appear just after injection and shortly before their leading edges reach ignition flame 114. When main spray plumes 120 reach ignition flame 114 combustion can be expected to commence.

INDUSTRIAL APPLICABILITY

Referring to the drawings generally, during operation of engine 14 piston 34 will be reciprocating up and down relative to engine housing 16, drawing air into combustion chamber 36 in an intake stroke by way of an air intake conduit 72, compressing the air within combustion chamber 36 in a compression stroke, and moving downward toward a bottom dead center position in response to a rapid pressurize rise from combustion in an expansion stroke. Piston 34 will thereafter return toward a top dead center position in an exhaust stroke to expel exhaust gases by way of an exhaust conduit 74 before repeating the conventional engine cycle. During a compression stroke, and typically just prior to reaching a top dead center position of piston 34, a pilot charge of gaseous fuel is injected from injection orifices 52 into combustion chamber 36, forming a plurality of pilot spray plumes such as pilot spray plumes 110.

As the plurality of pilot spray plumes 110 travel outwardly from injection orifices 52, one of spray plumes 110 is ignited by way of a spark produced at spark gap 42, or other electromagnetic discharge as described herein, at a desired and appropriate pilot ignition timing within combustion chamber 36. ECU 80 may be equipped to controllably produce the spark or other ignition-inducing event at a desired time, dependent upon factors such as a calculated arrival of the corresponding one of spray plumes 110 at spark gap 42. Spark gap 42 could also be energized for a sufficient time to provide some tolerance for imperfection in calculations or estimations of the pilot spray plume arrival. Flame front 112, as depicted in FIG. 2, may propagate from the spark-ignited pilot spray plume to the other pilot spray plumes 110 in a successive pattern. As described herein and depicted in the drawings, propagating of flame front 112 may proceed circumferentially around center axis 100.

Outlet check 50 may be lifted a first time to space a sealing surface 51 of outlet check 50 away from injector body 46 first distance 62 to cause the injection of the pilot charge. It will be appreciated that outlet check 50 may be closed completely or nearly completely after the injection of the pilot charge, and then lifted a second time to second lift distance 68 to cause injection of the main charge. The first time outlet check 50 is lifted the lifting may occur for a first time duration, and the second time outlet check 50 is lifted the lifting may occur for a second time duration that is longer than the first time duration. As discussed above, main spray plumes 120 can be expected to collide with ignition flame 114, and ignition of main spray plumes 120 will commence. The fuel and air mixture that is combusted may be overall stoichiometrically lean throughout the cylinder.

Those skilled in the art will be familiar with various advantages of diesel and other compression ignition engine systems, notably with regard to certain measures of efficiency, power, and torque. It is also of course well known that diesel and like engines can have certain properties with regard to emissions that are undesired in certain instances. Natural gas engines or other gaseous fuel engines have been proposed, and for various applications adopted, in an attempt to provide reduced-emission alternatives, especially for relatively high power applications. Gaseous fuel engines, however, suffer from drawbacks of their own. Relative difficulty in achieving ignition, especially for desired lean burn operation of gaseous fuel engines, has limited development and adoption of gaseous fuel technologies due to the requirement of specialized ignition hardware such as pre-chamber ignition devices and the like, and for still other reasons. The present disclosure offers an altogether new ignition and combustion strategy that combines certain of the advantages of direct injection diesel engines with the advantages of gaseous fuel engines.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating a gaseous fuel internal combustion engine comprising:
   conveying gaseous fuel in a gaseous state to a fuel injector in the internal combustion engine;
   injecting a total of one pilot charge of gaseous fuel from a plurality of fuel injection orifices of the fuel injector into a combustion chamber in the internal combustion engine to form a plurality of pilot spray plumes;
   igniting one of the plurality of pilot spray plumes at a fixed ignition point within the combustion chamber;
   propagating a flame front of the ignited pilot spray plume bidirectionally from the fixed ignition point to the other pilot spray plumes, such that an annular ignition flame is formed;
   injecting a main charge of gaseous fuel from the plurality of fuel injection orifices into the combustion chamber to form a plurality of main spray plumes; and
   igniting the plurality of main spray plumes within the combustion chamber by way of the annular ignition flame formed by the propagated flame front.

2. The method of claim 1 wherein the propagating further includes propagating the flame front such that the other pilot spray plumes are ignited, in advance of the igniting of the plurality of main spray plumes, from a total of one pilot spray plume ignited at the fixed ignition point.

3. The method of claim 2 wherein a center axis is defined by the plurality of fuel injection orifices and the annular ignition flame is centered on the center axis.

4. The method of claim 3 wherein the propagating of the flame front further includes propagating the flame front to form an ignition flame lying in plume paths of the plurality of main spray plumes.

5. The method of claim 1 further comprising lifting an outlet check within a fuel injector nozzle a first time to initiate the injection of the pilot charge, and lifting the outlet check a second time to initiate the injection of the main charge.

6. The method of claim 5 wherein the lifting of the outlet check a first time includes lifting the outlet check for a first time duration, and the lifting of the outlet check a second time includes lifting the outlet check for a second time duration that is longer than the first time duration, and further comprising closing the outlet check between the lifting of the outlet check a first time and the lifting of the outlet check a second time.

7. The method of claim 4 wherein a number of the fuel injection orifices is from 5 to 10 and an inter-orifice angle between adjacent ones of the plurality of fuel injection orifices is from 30 degrees to 90 degrees, and wherein a spray angle defined by the plurality of fuel injection orifices is from 90 degrees to 180 degrees.

8. The method of claim 1 wherein the igniting of the one of the pilot spray plumes at a fixed ignition point includes igniting the one of the pilot spray plumes at an electromagnetic discharge ignition point.

9. The method of claim 8 wherein the igniting of the one of the pilot spray plumes includes igniting the one of the pilot spray plumes at a spark gap defining the electromagnetic discharge ignition point and located on a circle that is intersected by plume paths from the plurality of fuel injection orifices.

10. A gaseous fuel internal combustion engine comprising:
    a gaseous fuel supply;
    a vaporizer;
    a fuel pump structured to pressurize gaseous fuel supplied in a gaseous state from the vaporizer;
    an engine housing including an engine block and an engine head assembly coupled with the engine block;
    a piston positioned to reciprocate within the engine block, and the piston, the engine block, and the engine head assembly defining a combustion chamber;
    an igniter supported within the engine head assembly and defining a fixed ignition point within the combustion chamber; and
    a fuel injector supported within the engine head assembly and coupled with the gaseous fuel supply by way of the vaporizer and the fuel pump, the fuel injector including an injector body having a nozzle, and an outlet check movable within the injector body to open and close a plurality of injection orifices formed in the nozzle, the plurality of injection orifices defining a center axis and a plurality of plume paths directed radially outward from the center axis and axially downward toward the piston, and the plurality of injection orifices being from 5 to 10 in number and arranged for injection of both pilot and main charges of gaseous fuel;
    a first one of the plume paths intersecting the fixed ignition point and the other plume paths being successively spaced from the fixed ignition point, such that a flame front formed by igniting a pilot spray plume injected along the first one of the plume paths is propagated to a plurality of other pilot spray plumes injected along the other plume paths to form an ignition flame positioned to ignite main spray plumes of a main charge of the gaseous fuel;
    the fixed ignition point lying on a circle intersected by each of the plurality of plume paths, such that the ignition flame formed by propagation of the flame front has an annular form and extends circumferentially around the center axis;
    the plurality of injection orifices defining a spray angle from 90 degrees to 180 degrees and an inter-orifice angle from 30 degrees to 90 degrees, and a distance from an outlet of the one of the plurality of injection orifices to the fixed ignition point being from 15 mm to 30 mm.

11. The engine of claim 10 wherein the fixed ignition point includes an electromagnetic discharge ignition point defined by the igniter.

12. The engine of claim 10 wherein the fuel injection orifices have a uniform spacing about the center axis and uniform spray angles such that the circle intersected by the plurality of plume paths lies in a plane oriented normal to the center axis.

13. The engine of claim 11 wherein the engine block forms a cylinder having a bore from 100 mm to 300 mm.

14. The engine of claim 10 wherein the engine block forms a plurality of cylinders, the piston is one of a plurality of pistons reciprocal one within each of the plurality of cylinders, and wherein the igniter includes a sparkplug that is one of a plurality of sparkplugs having a total number within the engine that is equal to a total number of the plurality of cylinders.

15. The method of claim 1 wherein the gaseous fuel internal combustion engine is operable in a load range, and wherein the injection of the main charge of gaseous fuel and the ignition of the plurality of main spray plumes occurs during operation of the gaseous fuel internal combustion engine in a full load portion of the load range.

16. A method of operating a gaseous fuel internal combustion engine comprising:
    conveying a gaseous fuel in a gaseous state to a fuel injector in the internal combustion engine;
    injecting a total of one pilot charge of the gaseous fuel from a plurality of fuel injection orifices of the fuel injector into a combustion chamber in the internal combustion engine;
    producing a plurality of pilot spray plumes from the plurality of fuel injection orifices that begin to overlap one another at locations radially outward from the plurality of injection orifices;
    igniting a total of one of the plurality of pilot spray plumes at a fixed ignition point within the combustion chamber;
    propagating a flame front of the ignited pilot spray plume bidirectionally from the fixed ignition point to the other pilot spray plumes, such that an annular ignition flame is formed;
    injecting a main charge of the gaseous fuel from the plurality of fuel injection orifices into the combustion chamber to form a plurality of main spray plumes; and
    igniting the plurality of main spray plumes within the combustion chamber by way of the annular ignition flame formed by the propagated flame front.

* * * * *